US008383231B2

(12) United States Patent
Horigome et al.

(10) Patent No.: US 8,383,231 B2
(45) Date of Patent: *Feb. 26, 2013

(54) SANDWICH PANEL

(75) Inventors: Hiroshi Horigome, Mitaka (JP); Masaaki Hirai, Joetsu (JP); Hiroshi Tanaka, Joetsu (JP)

(73) Assignees: Jamco Corporation, Tokyo (JP); Arisawa Mfg. Co., Ltd., Niigata (JP)

( * ) Notice: Subject to any disclaimer, the term of this patent is extended or adjusted under 35 U.S.C. 154(b) by 1316 days.

This patent is subject to a terminal disclaimer.

(21) Appl. No.: 11/634,248

(22) Filed: Dec. 6, 2006

(65) Prior Publication Data

US 2010/0035018 A1 Feb. 11, 2010

(30) Foreign Application Priority Data

Nov. 30, 2006 (JP) ................................. 2006-323885

(51) Int. Cl.
*B32B 5/02* (2006.01)
*B32B 7/00* (2006.01)

(52) U.S. Cl. ...................... 428/212; 428/116; 428/293.7; 428/297.1; 428/297.4; 428/421; 428/73

(58) Field of Classification Search .................... None
See application file for complete search history.

(56) References Cited

U.S. PATENT DOCUMENTS

| 4,368,234 A * | 1/1983 | Palmer et al. | 442/186 |
| 4,680,216 A | 7/1987 | Jacaruso | |
| 5,043,214 A * | 8/1991 | Das et al. | 428/359 |
| 5,604,010 A | 2/1997 | Hartz et al. | |
| 5,667,866 A * | 9/1997 | Reese, Jr. | 428/116 |
| 6,099,680 A | 8/2000 | Harris et al. | |
| 2002/0179271 A1 * | 12/2002 | Lindenfelser | 162/281 |

FOREIGN PATENT DOCUMENTS

| EP | 0 579 000 A1 | 1/1994 |
| JP | 6124439 A | 2/1986 |
| JP | 62-44444 A | 2/1987 |
| JP | 62044444 A | 2/1987 |
| JP | 63084932 A | 4/1988 |

(Continued)

OTHER PUBLICATIONS

Bitzer, T. "Honeycomb Technology: Materials, design, manufacturing, applications, and testing". Chapman & Hall, 1st edition, (1997), p. 89.*
Otani et al. Translation of JP 63-084932, Apr. 15, 1988.*
Pillai, K.M. "Governing equations for unsaturated flow through woven fiber mats. Part 1: Isothermal flows". Composites: Part A 33 (2002), 1007-1019.*

(Continued)

*Primary Examiner* — Maria Veronica Ewald
*Assistant Examiner* — Prashant J Khatri
(74) *Attorney, Agent, or Firm* — Sughrue Mion, PLLC

(57) ABSTRACT

A sandwich panel includes a middle material (2) and a surface material (3) that are laminated with a hollow columnar core (1). The middle material (2) is composed of a set of unidirectional fiber bodies (4, 5) each of whose fibers are aligned in one direction, and bonding layers formed by woven fiber bodies (6, 7). The woven fiber body (7) includes a warp yarn and a woof yarn that is orthogonal to the warp yarn, and the yarns are woven, and the woven fiber body (7) is formed so that any one of the warp yarn and the woof yarn is substantially parallel to the edge of the sandwich panel, and the other of the warp yarn and the woof yarn is substantially orthogonal to the edge of the sandwich panel.

6 Claims, 6 Drawing Sheets

| | | COMPARATIVE EXAMPLE | WORKING EXAMPLE 1 | WORKING EXAMPLE 2 | WORKING EXAMPLE 3 |
|---|---|---|---|---|---|
| WEIGHT (kg/m²) | | 1.38 | 1.39 | 1.59 | 1.59 |
| PEEL STRENGTH (N · in/3in) | | 51 | 60~80 | 60~80 | 60~80 |
| BENDING LOAD (N) | | 453 | 510 | 550 | 530 |
| IPS (kN) | | 14 | 20 | 22 | 24 |
| FLAME RETARDANT PROPERTIES /HRR | FIVE-MINUTE PEAK HEAT RELEASE RATE (kW/m²) | 40 | 25 | 23 | 23 |
| | TWO-MINUTE HEAT RELEASE INTEGRAL (kW · min/m²) | 36 | 25 | 23 | 23 |
| SMOKE DENSITY | | — | 9 | 11 | 11 |

FOREIGN PATENT DOCUMENTS

| | | |
|---|---|---|
| JP | 4-276435 A | 10/1992 |
| JP | 04276435 A | 10/1992 |
| JP | 05138742 A | 6/1993 |
| JP | 06047850 A | 2/1994 |
| JP | 6-17530 Y2 | 5/1994 |
| JP | 07125118 A | 5/1995 |
| JP | 07180281 A | 7/1995 |
| JP | 08258189 A | 10/1996 |
| JP | 2001049013 A | 2/2001 |
| JP | 2002011812 A | 1/2002 |
| JP | 2005313613 A | 11/2005 |
| JP | 2008511478 A | 4/2008 |
| WO | 92/17331 A1 | 10/1992 |

OTHER PUBLICATIONS

Pillai, K.M. et al. "Governing equations for unsaturated flow through woven fiber mats. Part 2: Non-isothermal reactive flows". Composites: Part A (2004), 403-415.*

Database WPI Week 198714, XP002573233, Thomson Scientific, London, GB; AN 1987-097066.

Database WPI Week 199246, XP002573234, Thomson Scientific, GB; AN 1992-376822.

International Search Report corresponding to European Patent Application No. 07023129.5-1217, Patent No. 1927464, dated Mar. 23, 2010.

* cited by examiner

FIG.5

|  | COMPARATIVE EXAMPLE | WORKING EXAMPLE 1 | WORKING EXAMPLE 2 | WORKING EXAMPLE 3 |
|---|---|---|---|---|
| WEIGHT ($kg/m^2$) | 1.38 | 1.39 | 1.59 | 1.59 |
| PEEL STRENGTH (N · in/3in) | 51 | 60~80 | 60~80 | 60~80 |
| BENDING LOAD (N) | 453 | 510 | 550 | 530 |
| IPS (kN) | 14 | 20 | 22 | 24 |
| FLAME RETARDANT PROPERTIES /HRR — FIVE-MINUTE PEAK HEAT RELEASE RATE ($kW/m^2$) | 40 | 25 | 23 | 23 |
| FLAME RETARDANT PROPERTIES /HRR — TWO-MINUTE HEAT RELEASE INTEGRAL ($kW · min/m^2$) | 36 | 25 | 23 | 23 |
| SMOKE DENSITY | — | 9 | 11 | 11 |

SANDWICH PANEL

BACKGROUND OF THE INVENTION

1. Field of the Invention

The present invention relates to a sandwich panel.

2. Description of the Related Art

The type of honeycomb sandwich panel disclosed in Examined Utility Model Application Publication No. 6-17530 is used conventionally. In this honeycomb sandwich panel, plastic bodies that are reinforced with carbon (C) fiber and used as middle layers are laminated on both the upper and lower surfaces (both open end surfaces) of a honeycomb core that is made of hollow columnar cells aggregated in a plane, and surface members are then laminated on the plastic bodies reinforced with carbon (C) fiber.

SUMMARY OF THE INVENTION

Since light weight is linked to enhanced fuel economy in aircraft, for example, there has recently been a need for reduced weight of structural materials and interior materials. The type of honeycomb sandwich panel described above in which fiber-reinforced plastic panels are placed on the top and bottom of a honeycomb core is used as a material that enables this weight reduction.

In particular, the inner wall material that is one of the interior materials used in an aircraft must be lightweight, and the flexural strength, in-plane shear strength, and peel strength between the honeycomb core and the upper and lower fiber-reinforced plastic layers must also be adequate for a sandwich panel. However, these characteristics cannot be made adequate merely by varying the amount of fibers or varying the number of fiber layers that constitute the middle layer.

The present invention was developed as a result of concentrated investigation in view of the foregoing drawbacks, and an object of the present invention is to provide a sandwich panel that has excellent practicality as an inner wall material used in aircraft, for example, whereby the abovementioned requirements of flexural strength, peel strength, and in-plane shear strength can be satisfied while having reduced weight by improving the adhesion between layers of middle material that are formed by laminating a plurality of fiber bodies.

A summary of the present invention will be given with reference to the accompanying drawings.

In a sandwich panel according to a first aspect of the present invention, a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 whose fibers are aligned in one direction, fibers in a first unidirectional fiber body 4 are in a direction that is substantially parallel to an edge of the sandwich panel, fibers in a second unidirectional fiber body 5 are in a direction that is substantially orthogonal to an edge of the sandwich panel, bonding layers 6, 7 having a resin content ratio of 50% or higher are provided between the unidirectional fiber bodies 4, 5 and between the hollow columnar core 1 and an inside unidirectional fiber body 5, the bonding layer 7 that is provided between the hollow columnar core 1 and the inside unidirectional fiber body 5 is composed of a woven fiber body 7 in which fibers are used for a warp yarn and a woof yarn that is orthogonal to the warp yarn, and the yarns are woven, and the woven fiber body 7 is formed so that any one of the warp yarn and the woof yarn is substantially parallel to the edge of the sandwich panel, and the other of the warp yarn and the woof yarn is substantially orthogonal to the edge of the sandwich panel.

In a sandwich panel according to a second aspect of the present invention, a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 whose fibers are aligned in one direction, fibers in a first unidirectional fiber body 4 are in a direction that is substantially parallel to an edge of the sandwich panel, fibers in a second unidirectional fiber body 5 are in a direction that is substantially orthogonal to an edge of the sandwich panel, the unidirectional fiber bodies 4, 5 have a resin content ratio of 30% or lower, a first bonding layer 6 having a resin content ratio of 50% or higher is provided between the unidirectional fiber bodies 4, 5, a second bonding layer 7 having a resin content ratio of 70% or higher is provided between the hollow columnar core 1 and an inside unidirectional fiber body 5, the second bonding layer 7 is composed of a woven fiber body 7 in which fibers are used for a warp yarn and a woof yarn that is orthogonal to the warp yarn, and the yarns are woven, and the woven fiber body 7 is formed so that any one of the warp yarn and the woof yarn is substantially parallel to the edge of the sandwich panel, and the other of the warp yarn and the woof yarn is substantially orthogonal to the edge of the sandwich panel.

The sandwich panel according to a third aspect of the present invention is the sandwich panel according to any one of the first and second aspects, wherein the bonding layer 6 comprises a woven fiber body 6 in which fibers are used for a warp yarn and a woof yarn, and the yarns are woven, and the woven fiber body 6 is formed so that any one of the warp yarn and the woof yarn is substantially parallel to the edge of the sandwich panel, and the other of the warp yarn and the woof yarn is substantially orthogonal to the edge of the sandwich panel, or the warp yarn and woof yarn are each tilted approximately 45° in relation to the edge of the sandwich panel.

The sandwich panel according to a fourth aspect of the present invention is the sandwich panel according to the third aspect, wherein carbon fibers are used for the fibers of the unidirectional fiber bodies 4, 5, and glass fibers are used for the fibers of the woven fiber bodies 6, 7.

The sandwich panel according to a fifth aspect of the present invention is the sandwich panel according to the third aspect, wherein carbon fibers are used for the fibers of the unidirectional fiber bodies 4, 5, and glass fibers and carbon fibers are used for the fibers of the woven fiber bodies 6, 7.

The sandwich panel according to a sixth aspect of the present invention is the sandwich panel according to any one of the first through fifth aspects, wherein a polyvinylidene fluoride film or a non-woven cloth that includes glass fibers is employed as the surface material 3.

The sandwich panel according to a seventh aspect of the present invention is the sandwich panel according to any one of the first through sixth aspects, wherein the sandwich panel has a weight per unit area of 1.59 kg/m² or less, a maximum bending load of 510 N or greater, a peel strength of 60 N·in/3 in or greater, and an in-plane shear strength of 20 kN or greater.

The present invention structured as described above provides a sandwich panel that has excellent practicality as an inner wall material used in aircraft, for example, whereby the abovementioned flexural strength, peel strength, and in-plane shear strength can be obtained while having reduced weight.

BRIEF DESCRIPTION OF THE DRAWINGS

FIG. 5 is a table showing the experimental results of the present working example.

DESCRIPTION OF THE PREFERRED EMBODIMENTS

Figure 1:
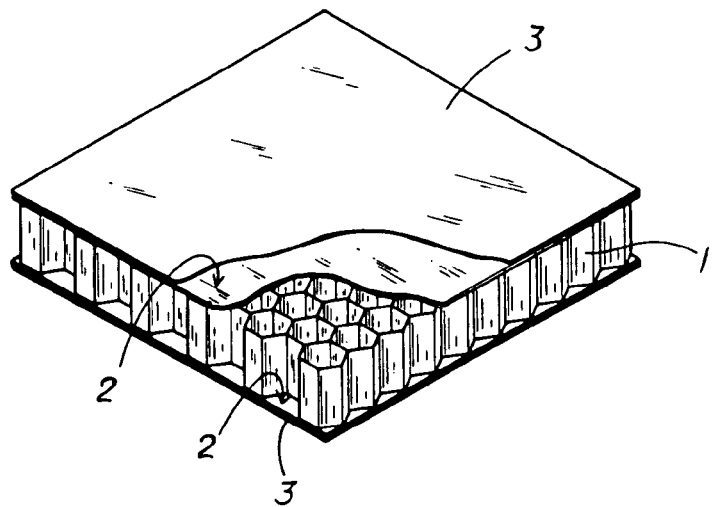
FIG. 1 is a schematic perspective view in which a portion of the present working example is removed.

Preferred embodiments of the present invention will be briefly described based on the drawings that show the operation of the present invention.

Satisfactorily bonding the unidirectional fiber bodies 4, 5 to each other and the hollow columnar core 1 to the inside unidirectional fiber body 5 through the use of bonding layers 6, 7 that have a resin content ratio of 50% or higher makes it possible to enhance adhesion between the layers, to enhance flexural strength, and to enhance peel strength between the upper and lower middle materials 2 and the hollow columnar core 1 while satisfying light weight even when the resin content ratio of the unidirectional fiber body 4, for example, is reduced by a certain amount (e.g., to 30% or lower).

Since a woven fiber body 7 is used as the bonding layer 7, the resin is satisfactorily retained by the fibers, the woven fiber body 7 and the hollow columnar core 1 can be satisfactorily bonded to each other, and the strength of the woven fiber body 7 and hollow columnar core 1 can be enhanced in comparison to a case in which an adhesive film or the like, for example, that does not contain fibers is used.

Furthermore, any one of the warp yarn and the woof yarn of the woven fiber body 7 is substantially parallel to the edge of the sandwich panel, and the other of the warp yarn and the woof yarn is substantially orthogonal to the edge of the sandwich panel. The flexural strength is therefore enhanced accordingly by matching the fiber directions of the unidirectional fiber bodies 4, 5.

The unidirectional fiber body 5 and the hollow columnar core 1, which are composed of different types of material, can be satisfactorily bonded to each other with minimal increase in weight, particularly when a bonding layer 6 having a resin content ratio of 50% or higher is provided between the unidirectional fiber bodies 4, 5, and a bonding layer 7 having a resin content ratio of 70% or higher is provided between the hollow columnar core 1 and an inside unidirectional fiber body 5.

Furthermore, when the bonding layer 6 is composed of a woven fiber body 6 in which the warp and woof yarns are each tilted approximately 45° in relation to an edge of the sandwich panel, for example, pseudo-isotropy can be created by the unidirectional fiber body 4 that is parallel to the edge of the sandwich panel, the unidirectional fiber body 5 that is orthogonal to the edge, and the woven fiber body 6 whose warp and woof yarns are tilted ±45° in relation to the edge, and the in-plane shear strength can be enhanced.

Working Example

A specific working example of the present invention will be described based on the drawings.

As shown in FIG. 1, the present working example is a sandwich panel which is square in plan view and in which a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 that are aligned in one direction, the fibers in a first unidirectional fiber body 4 are in a direction that is substantially parallel to an edge of the sandwich panel, the fibers in a second unidirectional fiber body 5 are in a direction that is substantially orthogonal to an edge of the sandwich panel, the resin content ratio of the unidirectional fiber bodies 4, 5 is set to 30% or lower, a first bonding layer 6 having a resin content ratio of 50% or higher is provided between the unidirectional fiber bodies 4, 5, a second bonding layer 7 having a resin content ratio of 70% or higher is provided between the hollow columnar core 1 and the inside unidirectional fiber body 5, the second bonding layer 7 is composed of a woven fiber body 7 in which fibers are used for a warp yarn and a woof yarn that is orthogonal to the warp yarn, and the yarns are woven, and the woven fiber body 7 is formed so that any one of the warp yarn and the woof yarn is substantially parallel to the edge of the sandwich panel, and the other of the warp yarn and the woof yarn is substantially orthogonal to the edge of the sandwich panel, and a polyvinylidene fluoride decorative film is employed as the surface material 3.

Each component will be specifically described.

A paper made of organic fibers (aramid fibers or cellulose fibers, for example) and impregnated with an incombustible resin, or an aggregate of numerous hexagonal aluminum cells in a plane (honeycomb core 1), is used as the hollow columnar core 1. The hollow columnar core 1 used in the present working example in particular has a density of 3 lb/ft$^3$ (pounds per cubic foot), a thickness of 10.5 mm, and a weight per unit area of 0.51 kg/m$^2$. The size of the hexagons is set so that the length of two opposing edges is ⅛ inch. The length of two opposing edges in the hexagons is not limited to ⅛ inch. The cell shape is also not limited to being hexagonal, and a square shape or any other hollow columnar shape may be used. A foam material having numerous holes inside, or another spongy porous material, may also be used.

A middle material 2 and a surface material 3 are laminated on the upper and lower surfaces (both open end surfaces) of the honeycomb core 1.

Figure 2:
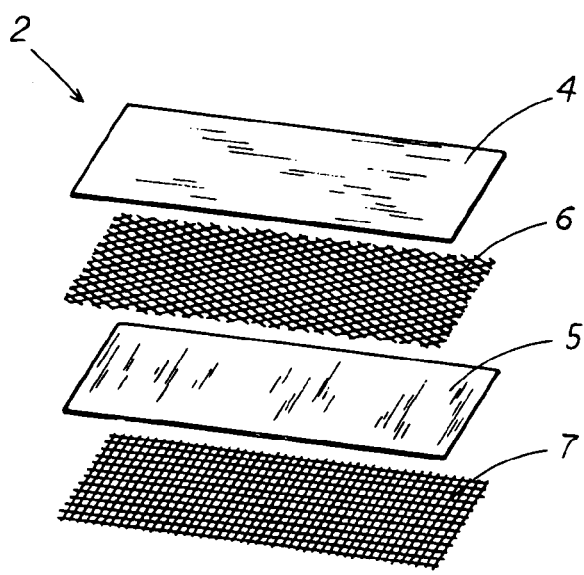
FIG. 2 is an enlarged schematic exploded perspective view showing the relevant portions of the present working example.

Specifically, as shown in FIG. 2, the middle material 2 is formed by the alternate lamination of a total of four layers comprising the unidirectional fiber bodies 4, 5 and the woven fiber bodies 6, 7 as bonding layers 6, 7. In the bonding layers, fibers are woven as a warp yarn and a woof yarn that is orthogonal to the warp yarn. In the present working example, the layers are laminated in sequence so that the outermost layer is the unidirectional fiber body 4 and the innermost layer is the woven fiber body 7.

Accordingly, even when the resin content ratio in the unidirectional fiber bodies 4, 5 is set to 30% or lower, since the bonding layers 6, 7 are provided between the unidirectional fiber bodies 4, 5 and between the honeycomb core 1 and the inside unidirectional fiber body 5, the adhesive force between the layers is enhanced. Specifically, providing the woven fiber bodies 6, 7 (as bonding layers 6, 7) between the unidirectional fiber bodies 4, 5 and between the honeycomb core 1 and the inside unidirectional fiber body 5 makes it possible to place a resin layer only in the position where adhesion strength is required from the woven fiber bodies 6, 7, and the weight of the unidirectional fiber bodies 4, 5 can be reduced.

In order to obtain the same level of adhesive force as in the present working example without providing the bonding layers 6, 7, for example, a resin content ratio of 42% or higher would be required in the unidirectional fiber bodies, and adequate weight-reducing effects would be impossible to obtain (the resin content ratio generally required in a unidirectional fiber body (single layer) is about 30%).

Carbon fibers are also employed as the fibers of the unidirectional fiber bodies 4, 5. The fibers used in the unidirectional fiber bodies 4, 5 are not limited to carbon fibers, and aramid fibers, for example, having a density of $2 \text{ g/cm}^3$ or less to reduce weight may also be used.

The fibers in the unidirectional fiber body 4 positioned on the outside are arranged in the direction (0°) that is substantially parallel to the longitudinal edge of the sandwich panel that is substantially rectangular in plan view. The fibers in the other unidirectional fiber body 5 are arranged in the direction (90°) that is substantially perpendicular to the longitudinal edge of the sandwich panel. The fiber direction of the unidirectional fiber body 4 may also be set to 90°, and the fiber direction of the unidirectional fiber body 5 may be set to 0°.

Glass fibers are employed as the fibers of the woven fiber bodies 6, 7. Blended woven fiber bodies composed of glass fibers and carbon fibers may also be used as the woven fiber bodies 6, 7.

Specifically, a woven fiber body (which has a weaving direction of ±45°) that is woven so that the warp yarn and the woof yarn are each angled approximately 45° in relation to the edge (longitudinal direction) of the sandwich panel is used as the woven fiber body 6 for bonding the unidirectional fiber bodies 4, 5 to each other. Woven fiber bodies in which the warp and woof yarns intersect at 0° and 90° in the usual manner may be used as the woven fiber bodies 6, 7 and laminated so that the warp yarn and the woof yarn are each tilted approximately 45° in relation to the edge of the sandwich panel.

A woven fiber body (which has weaving directions of 0° and 90°) woven so that the warp yarn is substantially parallel (0°) to the edge of the sandwich panel and that the woof yarn is substantially orthogonal (90°) to the edge of the sandwich panel is used as the woven fiber body 7 positioned on the inside and used to bond the honeycomb core 1 and the unidirectional fiber body 5. The extension direction of the warp yarn may be set to 90°, and the extension direction of the woof yarn may be set to 0°. The flexural strength can be even further enhanced by setting the weaving directions of the woven fiber body 7 to 0° and 90°.

Accordingly, pseudo-isotropy is exhibited overall in the middle material 2 by the set of unidirectional fiber bodies 4, 5 whose fibers are directed at 0° and 90°, and the woven fiber body 6 whose fibers are directed at ±45° between the fiber directions of the unidirectional fiber bodies 4, 5. Because the fibers are arranged at ±45° in the woven fiber body 6 in particular, the arrangement of the fibers in the tension direction (vertical direction of the in-plane shear test described hereinafter) and compression direction (horizontal direction of the in-plane shear test described hereinafter) of in-plane shear enhances the in-plane shear strength.

In the manufacturing process of the present working example, the unidirectional fiber bodies 4, 5 and the woven fiber bodies 6, 7 are each impregnated with a heat-curable resin composition and heat-dried for 5 to 20 minutes at 80 to 100° C. to form prepregs, and the prepregs are laminated with the honeycomb core 1 in the abovementioned sequence and cured by heat-pressing at a pressure of 0.2 to 0.4 MPa and a temperature of 140 to 160° C. for 1 to 2 hours. This method in which prepregs are formed from each fiber body, and the prepregs are then laminated and heat-pressed as described above is not limiting, and a method may also be used in which the fiber bodies are collectively impregnated with the resin composition in the laminated state and heat-dried to form prepregs, and the prepregs as such are heat-pressed.

A woven fiber body 6 is used as the bonding layer 6 in the present working example, but when an adhesive film that does not include fibers is used, the manufacturing process comprises heat-pressing after laminating each of the prepregged fiber bodies 4, 5, 7 with the adhesive film. In this case, the adhesive film can compensate for the decrease in adhesive force between the unidirectional fiber bodies 4, 5 that occurs when the resin content ratio of the unidirectional fiber bodies 4, 5 is decreased to 30% or less, and the adhesive force between the layers can be enhanced.

The resin used in the prepregs is a resol-based phenol resin selected with consideration for non-combustibility as an inner wall material for an aircraft interior. The specific resol-based phenol resin used has a five-minute peak heat release rate (HRR) of $30 \text{ kW/m}^2$ or less in a heat release test, a two-minute heat release integral of $30 \text{ kW·min/m}^2$ or less, and a smoke density of 200 or less during combustion. The abovementioned values were obtained when the HRR and smoke density were measured in accordance with the FAR25.853 specification required for aircraft interiors.

Figure 3:
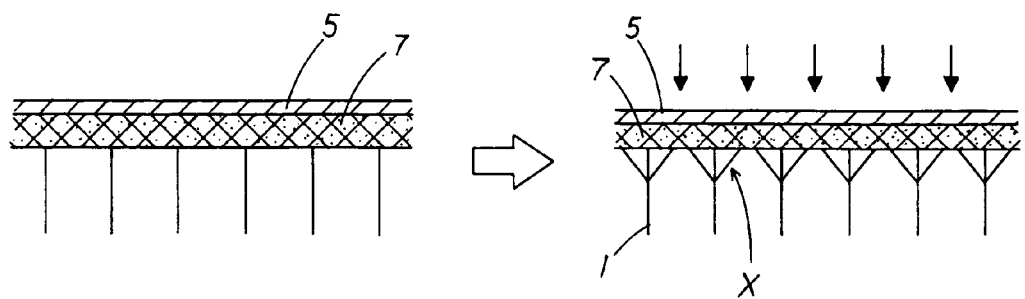
FIG. 3 is a schematic sectional view showing the cross-sectional structure of the present working example.

Since a woven fiber body 7 is used as the bonding layer 7 between the honeycomb core 1 and the inside unidirectional fiber body 5 in the present working example, the resin is satisfactorily retained by the fibers acting as a substrate, and the resin is less prone to flow out under heat-pressing. Specifically, the resin seeps out as shown in FIG. 3 under heat-pressing, but the resin cannot easily flow along the wall surfaces of the honeycomb core 1, and the resin remains near the open end portion on the upper side of the honeycomb core 1. A wide triangular bonding layer X called a fillet is formed when the somewhat molten resin remains in the vicinity of the open end portion on the upper side of the honeycomb core 1. Accordingly, the adhesive surface area between the woven fiber body 7 and the honeycomb core 1 increases, thereby creating an extremely sound adhesive force and enhancing the in-plane shear strength.

Figure 4:
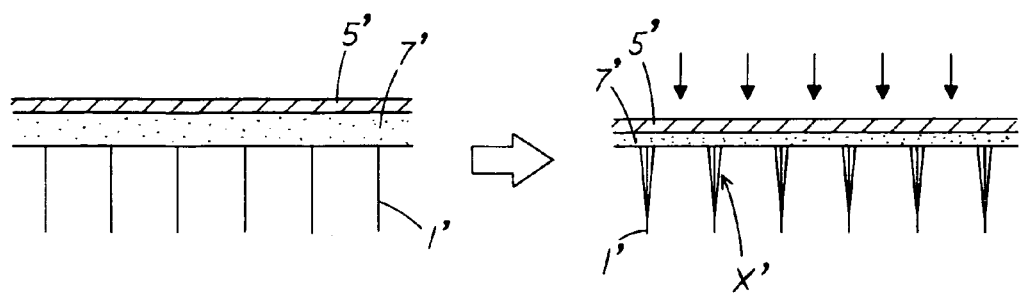
FIG. 4 is a schematic sectional view showing the cross-sectional structure of a conventional example.

The resin of an adhesive film 7' shown in FIG. 4 is not retained by a substrate when an adhesive film 7' that does not have fibers to act as a substrate is used as the abovementioned bonding layer 7, and the resin therefore easily flows out from between a honeycomb core 1' and a unidirectional fiber body 5'. Specifically, the resin that is melted by heat-pressing does not remain in the vicinity of the upper open end portion of the honeycomb core 1', but flows down to the lower open end portion along the wall surface of the honeycomb core 1', and a bonding layer X' that corresponds to the abovementioned fillet is an extremely narrow triangle. Accordingly, the adhesion surface area between the adhesive film 7' and the honeycomb core 1' is extremely small compared to the present working example, adequate adhesive force is not demonstrated, the layers easily become misaligned with each other, and the in-plane shear strength is reduced.

Adhesion increases as the resin content ratio of the woven fiber bodies is increased, but the weight of the fiber bodies as an aircraft material increases when the resin content ratio is increased. Therefore, the inventors discovered that weight can be reduced while maintaining adhesion between the unidirectional fiber body 5 and the honeycomb core 1 that are composed of different types of materials. This can be achieved by setting the fiber content of the woven fiber body 7 furthest inside to 20 to 40 g/m$^2$, and the resin content (resin content ratio) thereof to 70 to 85 wt %, and by setting the fiber content of the other woven fiber body 6 to 35 to 55 g/m$^2$, and the resin content thereof to 50 to 65 wt %. In the present working example, the resin content ratio of the unidirectional fiber bodies 4, 5 is set to 29%, the resin content ratio of the woven fiber body 6 is set to 55%, and the resin content ratio of the woven fiber body 7 is set to 75%. The fiber content of the unidirectional fiber bodies 4, 5 is set to 100 to 120 g/m$^2$.

Specifically, the adhesive force between the honeycomb core 1 and the unidirectional fiber body 5 is reduced by setting the resin content ratio of the unidirectional fiber bodies 4, 5 to 30% or less in the present working example, but adhesion between the honeycomb core and the inside unidirectional fiber body 5 is enhanced by inserting a prepreg (woven fiber body 7) having a high resin content ratio in between the honeycomb core 1 and the inside unidirectional fiber body 5 to form a bonding layer between the honeycomb core 1 and the inside unidirectional fiber body 5. The adhesive force between the honeycomb core 1 and the inside unidirectional fiber body 5, the flexural strength of the honeycomb sandwich panel, the peel strength between the honeycomb core 1 and the upper and lower middle layers 2, and the in-plane shear strength are also enhanced.

In order to obtain an adhesive force, flexural strength, peel strength, and in-plane shear equivalent to those of the present working example without providing the bonding layers 6, 7, for example, a resin content ratio of 60% or higher would be required in the unidirectional fiber bodies, and adequate weight-reducing effects would be impossible to obtain.

Accordingly, the present working example is an inner wall material that is suitable for the interior of an aircraft, has a low weight per unit area of 1.59 kg/m$^2$ or less, and can be endowed with a maximum bending load of 530 N or greater, a peel strength of 80 N·in/3 in or greater, and an in-plane shear strength of 24 kN or greater.

A non-woven cloth that includes glass fibers, i.e., glass paper, glass cloth, or the like may be employed as the surface material 3. When a fiber body that has electrical insulating properties is used as the surface material 3, the sandwich panel has excellent corrosion resistance and is free of electrical corrosion even when the sandwich panel comes in contact with aluminum material in the aircraft assembly process.

The present working example has the abovementioned configuration in which the unidirectional fiber bodies 4, 5 are satisfactorily bonded to each other, and the honeycomb core 1 is satisfactorily bonded to the inside unidirectional fiber body 5 by the bonding layers 6, 7 that have a resin content ratio of 50% or higher. Therefore, adhesion between the layers can be enhanced, and the flexural strength of the sandwich panel and the peel strength between the honeycomb core and the upper and lower middle layers can be enhanced while maintaining light weight even when the resin content ratio of the unidirectional fiber body 4 is reduced to 30% or less, for example.

In particular, since a woven fiber body 7 is used as the bonding layer 7 between the hollow columnar core 1 and the inside unidirectional fiber body 5, the resin is satisfactorily retained by the fibers, the woven fiber body 7 and the hollow columnar core 1 can be satisfactorily bonded to each other, and the strength of the woven fiber body 7 and hollow columnar core 1 can be enhanced in comparison to a case in which an adhesive film or the like, for example, that does not contain fibers is used.

Furthermore, any one of the warp yarn and the woof yarn of the woven fiber body 7 is substantially parallel to the edge of the sandwich panel, and the other of the warp yarn and the woof yarn is substantially orthogonal to the edge of the sandwich panel. The flexural strength is therefore enhanced accordingly by matching the fiber directions of the unidirectional fiber bodies 4, 5.

The unidirectional fiber body 5 and the hollow columnar core 1, which are composed of different types of material, can be satisfactorily bonded to each other with minimal increase in weight, particularly when a bonding layer 6 having a resin content ratio of 50% or higher is provided between the unidirectional fiber bodies 4, 5, and a bonding layer 7 having a resin content ratio of 70% or higher is provided between the hollow columnar core 1 and the inside unidirectional fiber body 5.

Furthermore, since the bonding layer 6 is composed of a woven fiber body 6 in which the warp and woof yarns are each tilted approximately 45° in relation to an edge of the sandwich panel, pseudo-isotropy can be created by the unidirectional fiber body 4 that is parallel to the edge of the sandwich panel, the unidirectional fiber body 5 that is orthogonal to the edge, and the woven fiber body 6 whose warp and woof yarns are tilted ±45° in relation to the edge, and the in-plane shear strength can be enhanced.

Accordingly, the present working example provides a sandwich panel that has excellent practicality as an inner wall material used in aircraft, for example, whereby the abovementioned flexural strength, peel strength, and in-plane shear strength can be obtained while having reduced weight.

The effect of the present working example will be described using supporting experimental examples.

The weight, peel strength, flexural strength, in-plane shear strength, flame-retardant properties, and smoke density were measured by a conventional example in which a pair of unidirectional fiber bodies at 0° and 90° having a phenol resin content ratio of approximately 30% were placed one layer at a time directly on the upper and lower surfaces of a honeycomb core without the use of the abovementioned bonding layers 6, 7; Working Example 1 in which an adhesive film (resin content ratio of 100%) was used as the abovementioned bonding layer 6; Working Example 2 in which a woven fiber body 6 having fiber directions of 0° and 90° (the same as the abovementioned woven fiber body 7) was used as the abovementioned bonding layer 6; and Working Example 3 in which the abovementioned woven fiber body 6 having a fiber direction of ±45° was used. The results of the measurements are shown in FIG. 5.

Figure 6:
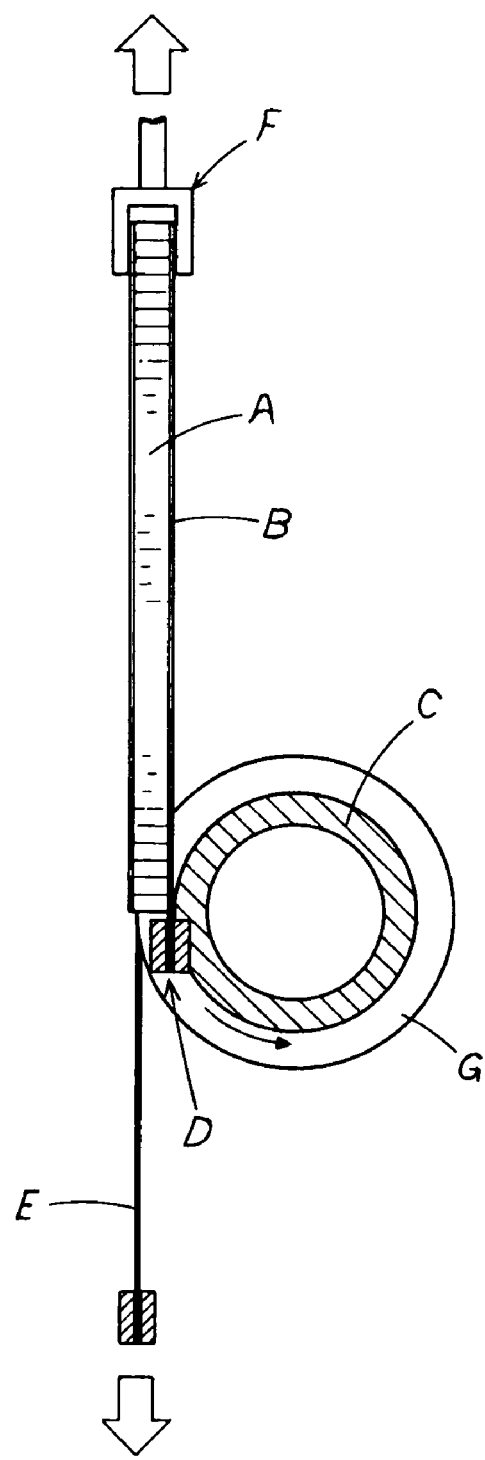
FIG. 6 is a schematic diagram showing the experimental apparatus.

The peel strength was measured using a commonly used drum peel testing apparatus of the type shown in FIG. 6. The reference symbol A in the diagram indicates the honeycomb core, B indicates the middle layer, C indicates the drum, D indicates a lower clamp, E indicates a loading strap, F indicates an upper clamp, and G indicates a flange.

Figure 7:
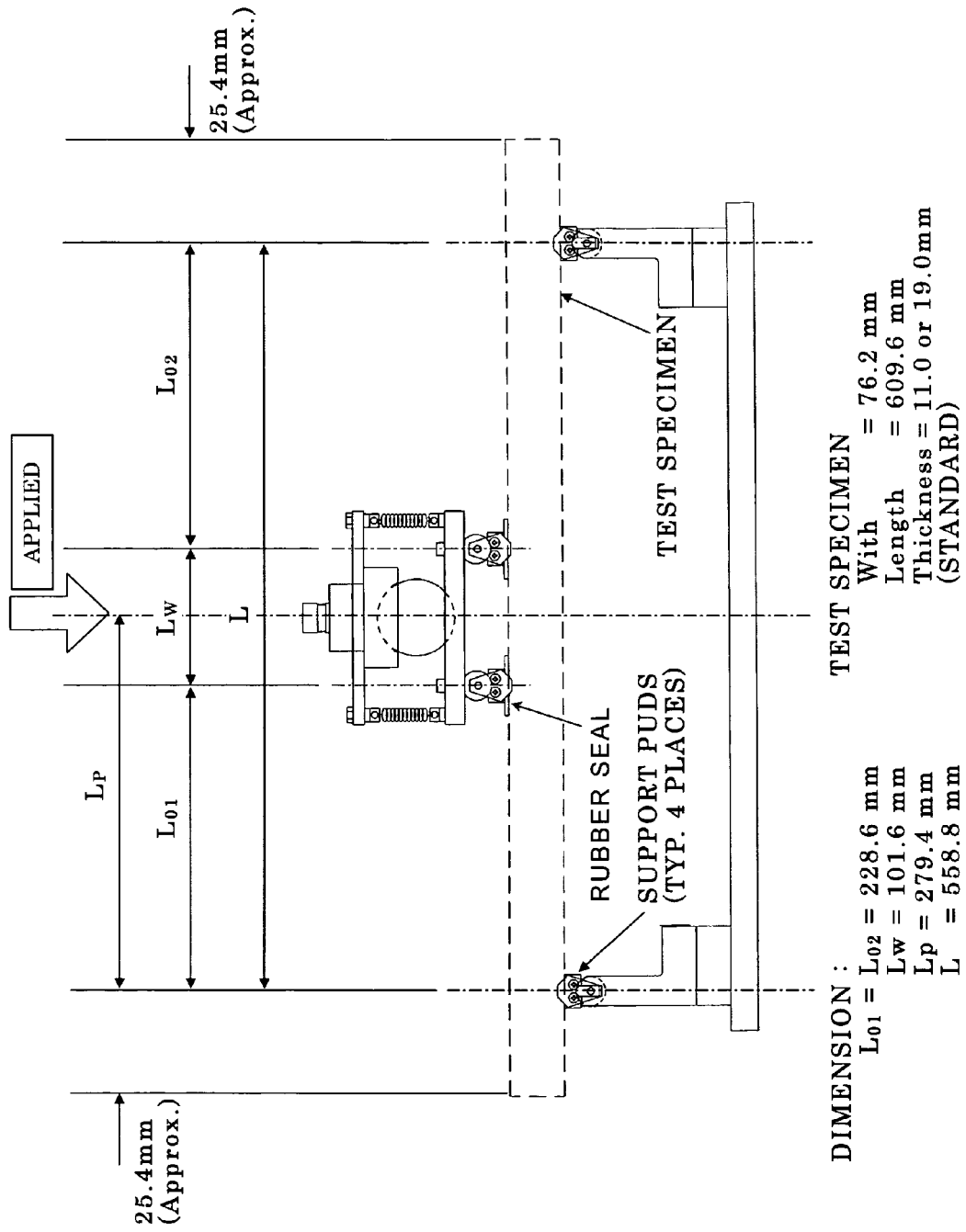
FIG. 7 is a schematic diagram showing the experimental apparatus.

The flexural strength (bending load) was measured at normal temperature (23±2° C.) and normal humidity (50±5% RH) using the type of device shown in FIG. 7 in accordance with bend test specification MIL-STD401B, and the speed was set to a speed whereby the sample broke in 3 to 5 minutes.

Figure 8:
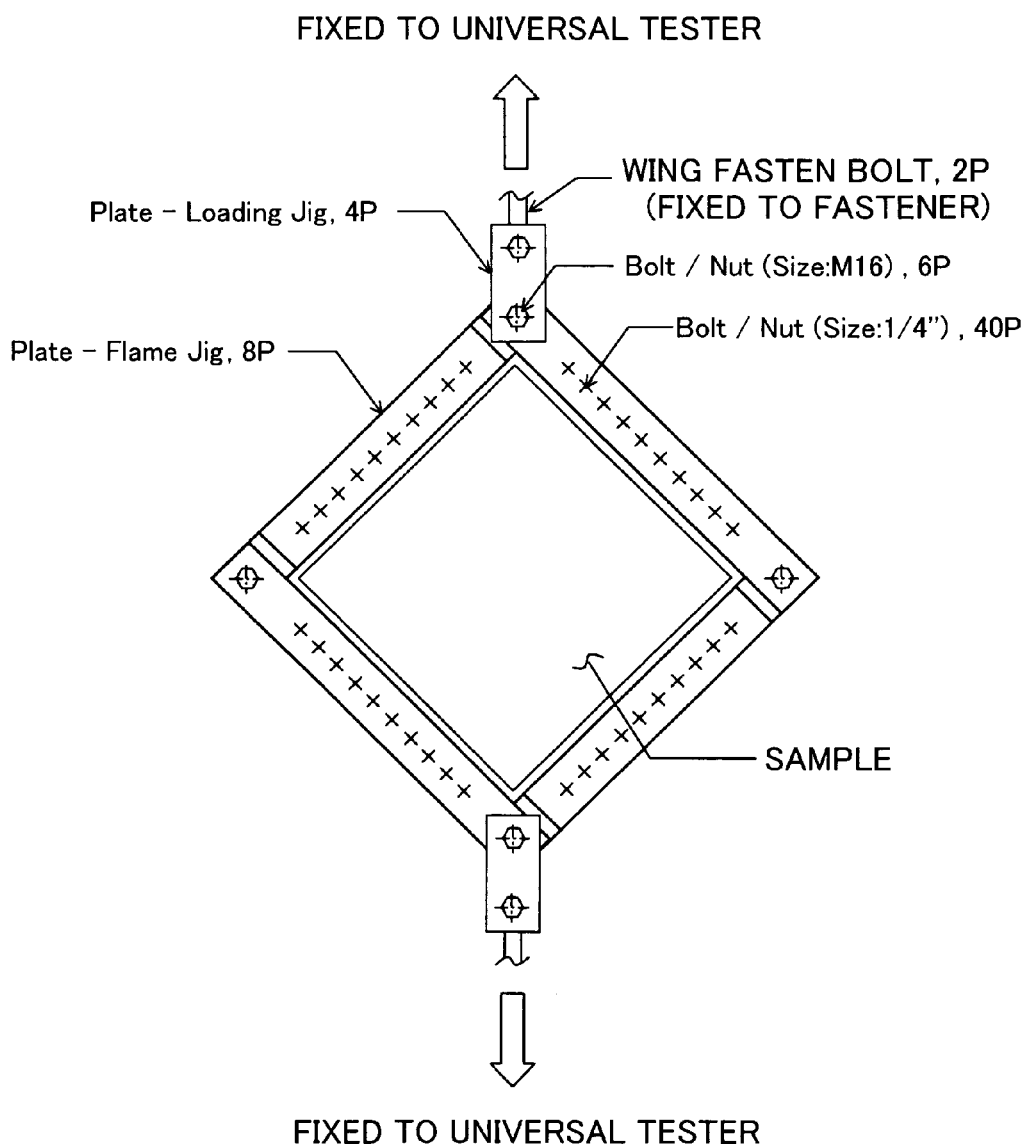
FIG. 8 is a schematic diagram showing the experimental apparatus.

The in-plane shear strength (IPS) was measured using the type of device shown in FIG. 8 according to an in-plane shear test (BMS4-17) used by Boeing Company (the measurement device was a Shimadzu Autograph AG-10).

It is apparent from the test results that although the conventional example that did not have the bonding layers 6, 7 was accordingly lightweight, the conventional example was markedly inferior to Working Examples 1 through 3 with respect to peel strength, bending load, IPS, and flame retardant properties.

Specifically, it was confirmed that peel strength, flexural strength, in-plane shear strength, and flame retardant properties can be significantly enhanced with minimal increase in weight by providing bonding layers 6, 7 to improve adhesion between the unidirectional fiber bodies 4, 5 and adhesion between the honeycomb core 1 and the inside unidirectional fiber body 5. The smoke density was also confirmed to be significantly lower than 200, which is the common standard in materials used for aircraft interiors.

Adhesion can be improved in the conventional example by increasing the resin content ratio of the unidirectional fiber bodies, but a significant increase in weight is inevitable, as mentioned above.

Furthermore, it was confirmed by comparison of Working Examples 1, 2, and 3 that the use of the woven fiber body 6 as the bonding layer 6 enables further enhancement of strength.

It was also confirmed by comparison of Working Examples 2 and 3 that the flexural strength or the in-plane shear strength can be selectively increased by setting the fiber direction of the woven fiber body 6 to the same direction as that of the unidirectional fiber bodies 4, 5 or midway between the fiber directions of the unidirectional fiber bodies 4, 5.

The abovementioned results confirmed that providing bonding layers having a high resin content ratio between the unidirectional fiber bodies and between the honeycomb core and the unidirectional fiber bodies to enhance adhesion between the layers, and providing woven fiber bodies in the bonding layers yields a lightweight sandwich panel that satisfies the requirements of flexural strength, peel strength, and in-plane shear strength for an inner wall material used in aircraft.

What is claimed is:

1. A sandwich panel comprising:
a hollow columnar core;
a middle material layered on a first surface of the hollow columnar core and layered on a second surface of the hollow columnar core;
a surface material layered on the middle material layered on the first surface of the hollow columnar core and layered on the middle material layered on the second surface of the hollow columnar core,
wherein said middle material comprises:
   a first unidirectional fiber body, said first unidirectional fiber body having fibers that are aligned in a direction that is substantially parallel to an edge of the sandwich panel;
   a second unidirectional fiber body, said second unidirectional fiber body having fibers that are aligned in a direction that is substantially orthogonal to the edge of the sandwich panel;
   a first bonding layer having a resin content ratio of 50% or higher provided between the first unidirectional fiber body and the second unidirectional fiber body; and
   a second bonding layer having a resin content ratio of 50% or higher provided between said hollow columnar core and said second unidirectional fiber body,
wherein the second bonding layer is composed of a woven fiber body in which fibers are used for a warp yarn and a woof yarn, and the yarns are woven, the warp yarn and the woof yarn being orthogonal to each other,
wherein the woven fiber body is formed so that one of said warp yarn and said woof yarn is substantially parallel to said edge of the sandwich panel, and the other of the warp yarn and the woof yarn is substantially orthogonal to said edge of the sandwich panel, and
wherein the resin content ratio is a ratio between a weight of resin in a bonding layer and a weight of the bonding layer containing the resin,
wherein the sandwich panel has a weight per unit area of 1.59 kg/m$^2$ or less, a maximum bending load of 510 N or greater, a peel strength of 60·N in/3 in or greater, and an in-plane shear strength of 20 kN or greater.

2. A sandwich panel comprising:
a hollow columnar core;
a middle material layered on a first surface of the hollow columnar core and layered on a second surface of the hollow columnar core;
surface material layered on the middle material layered on the first surface of the hollow columnar core and layered on the middle material layered on the second surface of the hollow columnar core,
wherein said middle material comprises:
   a first unidirectional fiber body, said first unidirectional fiber body having fibers that are aligned in a direction that is substantially parallel to an edge of the sandwich panel, the first unidirectional fiber body having a resin content ratio of 30% or lower;
   a second unidirectional fiber body, said second unidirectional fiber body having fibers that are aligned in a direction that is substantially orthogonal to the edge of the sandwich panel, the second unidirectional fiber body having a resin content ratio of 30% or lower;
   a first bonding layer having a resin content ratio of 50% or higher provided between the first unidirectional fiber body and the second unidirectional fiber body; and
   a second bonding layer having a resin content ratio of 70% or higher provided between the hollow columnar core and the second unidirectional fiber body,
wherein the second bonding layer is composed of a woven fiber body in which fibers are used for a warp yarn and a woof yarn, and the yarns are woven, the warp yarn and the woof yarn being orthogonal to each other,
wherein the woven fiber body is formed so that one of said warp yarn and said woof yarn is substantially parallel to said edge of the sandwich panel, and the other of the warp yarn and the woof yarn is substantially orthogonal to said edge of the sandwich panel, and
wherein resin content is a ratio between a weight of resin in a bonding layer and a weight of the bonding layer containing the resin,
wherein the sandwich panel has a weight per unit area of 1.59 kg/m$^2$ or less, a maximum bending load of 510 N or greater, a peel strength of 60·N in/3 in or greater, and an in-plane shear strength of 20 kN or greater.

3. The sandwich panel according to any one of claims 1 and 2, wherein:
said first bonding layer comprises a woven fiber body in which fibers are used for a warp yarn and a woof yarn, and the yarns are woven; and
the woven fiber body of said first bonding layer is formed so that any one of the warp yarn and the woof yarn is substantially parallel to said edge of the sandwich panel, and the other of the warp yarn and the woof yarn is substantially orthogonal to said edge of the sandwich panel, or said warp yarn and woof yarn are each formed approximately 45° in relation to said edge of said sandwich panel.

4. The sandwich panel according to claim 3, wherein carbon fibers are used for the fibers of said first unidirectional fiber body and said second unidirectional fiber body, and glass fibers are used for the fibers of said woven fiber bodies of said first bonding layer and said second bonding layer.

5. The sandwich panel according to claim 3, wherein carbon fibers are used for the fibers of said first unidirectional fiber body and said second unidirectional fiber body, and glass fibers and carbon fibers are used for the fibers of said woven fiber bodies of said first bonding layer and said second bonding layer.

6. The sandwich panel according to any one of claims 1 and 2, wherein a polyvinylidene fluoride film or a non-woven cloth that includes glass fibers is used for said surface material.

* * * * *

UNITED STATES PATENT AND TRADEMARK OFFICE
CERTIFICATE OF CORRECTION

PATENT NO. : 8,383,231 B2
APPLICATION NO. : 11/634248
DATED : February 26, 2013
INVENTOR(S) : Hiroshi Horigome et al.

Page 1 of 1

It is certified that error appears in the above-identified patent and that said Letters Patent is hereby corrected as shown below:

In the Specifications:

Column 6, Line 8: delete "." after "°C"

Column 8, Line 62: delete "." after "°C"

In the Claims:

Column 10, Line 13: delete "60 · N in/3" and insert --60N · in/3--

Signed and Sealed this
Twentieth Day of August, 2013

Teresa Stanek Rea
*Acting Director of the United States Patent and Trademark Office*